Feb. 18, 1936.  R. B. DAY  2,031,561
METHOD AND APPARATUS FOR TREATING RUBBER ARTICLES
Filed March 23, 1934   3 Sheets-Sheet 1

Inventor
Ralph B. Day

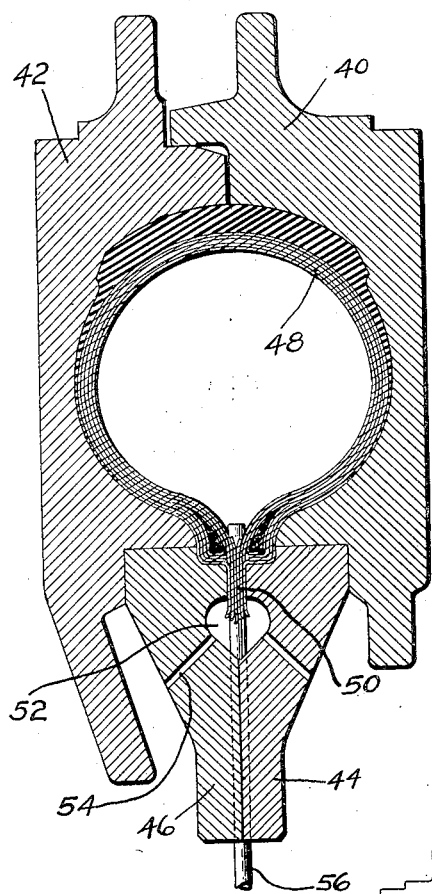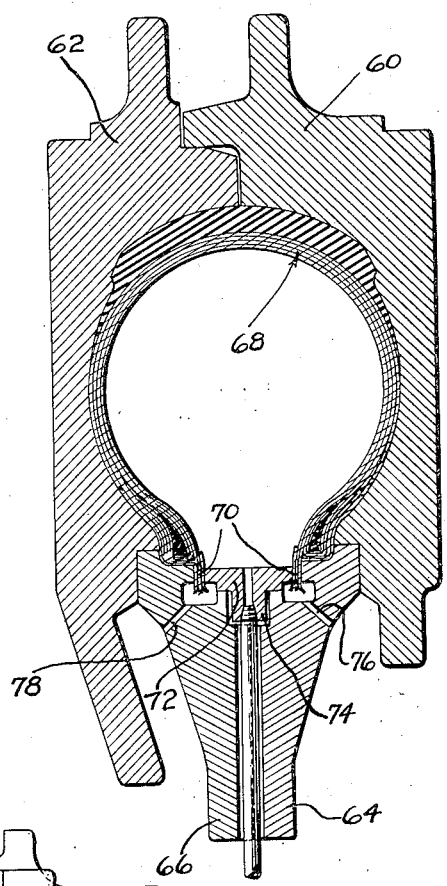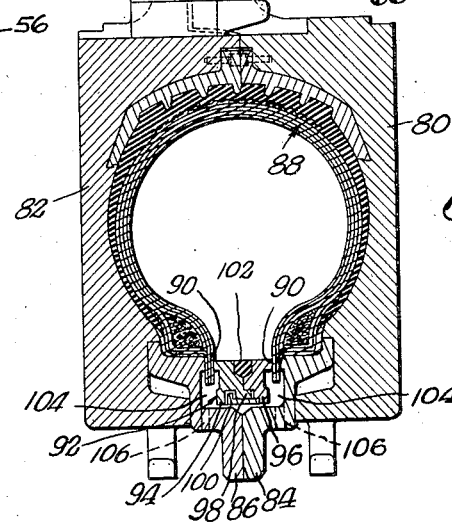

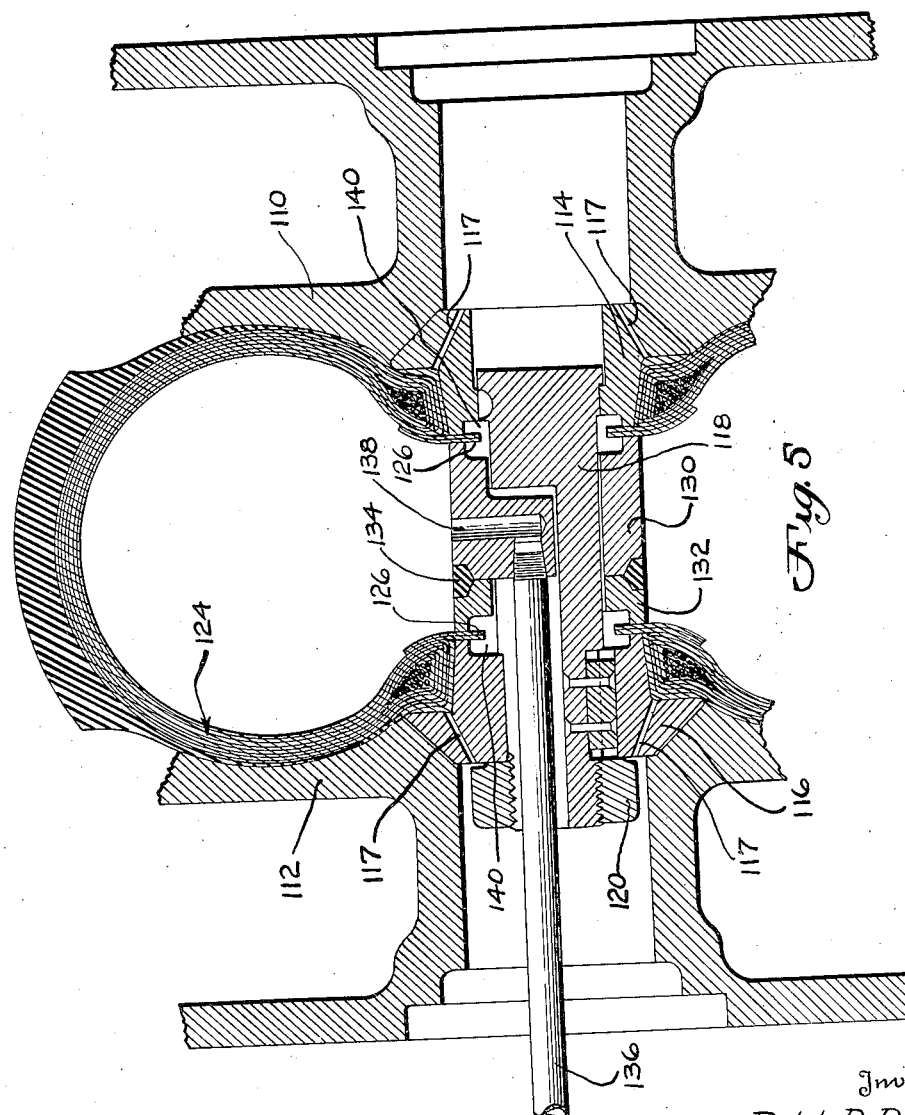

Patented Feb. 18, 1936

2,031,561

UNITED STATES PATENT OFFICE 2,031,561

METHOD AND APPARATUS FOR TREATING RUBBER ARTICLES

Ralph B. Day, Akron, Ohio, assignor to Wingfoot Corporation, Wilmington, Del., a corporation of Delaware Application March 23, 1934, Serial No. 717,064

17 Claims. (Cl. 18—42)

This invention relates to a method of and apparatus for curing or vulcanizing moldable plastic articles incorporating layers of fiber, fabric or other material pervious to fluids, gases or liquids. The invention more particularly relates to the manufacture of pneumatic tires built up of layers of rubberized fabric and the invention is concerned with improved methods and apparatus for effectively vulcanizing the rubber tires without the use of internal inflatable members such as the standard air-bag normally employed in the vulcanizing operation.

My copending application Serial Numbers 561,122 filed September 4, 1931 and 631,202 filed August 31, 1932, as well as my abandoned application 510,101 filed January 21, 1931, discuss in considerable detail the difficulties encountered in vulcanizing plied rubber and fabric articles such as pneumatic tires wherein internal shaping means such as airbags are eliminated with merely fluid under pressure being employed within the tire to force the plied rubber and fabric into intimate contact with the vulcanizing mold during the curing operation. The present invention is an improvement over and a continuation of the methods and apparatus disclosed and claimed in my referred-to applications and is adapted to effect a rapid, uniform, efficient and complete cure or vulcanization without the use of internal airbags.

In the manufacture of articles comprising rubberized fabric plies such as pneumatic tires, air is quite often trapped between the various plies or layers of the tire during the building, shaping or vulcanizing operations. The air has been found to flow along thru the cords of the tire carcass, which are somewhat pervious thereto but the fluid cannot escape thru the relatively thick rubber side walls or tread portion of the tire and it may therefore form blisters in the tire carcass which may cause blows, blisters or ply separation in the carcass during vulcanization or sometimes upon release of the fluid pressure within the hot tire immediately after cure.

In the past it has been difficult to remove, during the vulcanizing operation, air entrapped in the tire carcass inasmuch as the usual internal airbag and tight-fitting mold parts as well as the rubber tread and sidewalls of the tire have prevented the escape of the trapped air or other fluid. Again when the usual airbag is replaced by some means such as the so-called "bull ring" illustrated and described in my copending application Ser. No. 561,122 it is still substantially impossible to allow the air trapped in the tire carcass to escape during the vulcanizing operation without resorting to special venting means such as described in my copending applications referred to above. Moreover it has been experienced that with the bull-ring type of sealing rings adjacent the beads of the tire during the vulcanizing operation certain special arrangements adapted to permit bleeding of the entrapped fluid in the tire carcass are apt to permit the escape of the pressure from within the tire carcass which pressure holds the carcass tightly against the molds during the vulcanizing operation. The fluid pressure within the tire has been found apt to escape or the like in the use of particular, prior known bull-rings between the ring and the bead portions of the tire. This is very undesirable.

It is an object of the present invention to provide an improved method and apparatus for rapidly and efficiently vulcanizing a rubberized fabric-ply article wherein the fluid entrapped between the various plies of the article and in the fabric thereof during the building operation or seeping into the plies during the cure can be sufficiently removed during the vulcanizing operation without sacrificing the pressure with which the article is pressed into its mold during the cure.

Another object of the invention is to provide a method and apparatus for eliminating the use of internal airbags during the vulcanization of pneumatic tires and for replacing these means with special mold rings which so engage with the bead portions of the tire that the interior of the tire will be completely sealed to permit effective molding pressure to be built up therein and with the rings functioning also to vent the carcass of the tire to the atmosphere or to the interior of the mold heater to permit the escape of entrapped fluids during the vulcanizing operation.

Another object of the invention is to provide method and apparatus for curing pneumatic tires and the like wherein pinch toes in the form of fabric projections or areas are provided at the toe or other portions of the tire, which pinch toes are clamped by suitable sealing rings so as to close off the interior of the tire with the rings, at the same time allowing the escape of fluid from the tire carcass during the vulcanizing operation, either through the clamped portion of the pinch toes or thru pervious surfaces in the tire.

Another object of the invention is to provide improved means for sealing the bead portions of a tire during the vulcanizing operation, said means being adapted to be expanded against portions of the tire or extensions thereof by the internal pressure in the tire during the curing operation. These expansible means are adapted to function entirely independent of the ram or other pressure upon the mold halves and the various parts are so designed that the pressure on the mold halves is carried directly therethrough without in any way being carried by the expansible means.

Another object of the invention is to provide apparatus for supporting and sealing the bead portions of a tire or extension thereof during the curing operation so that an internal air bag can be eliminated, and providing these supporting and sealing means with such a relation of parts as to permit the bleeding or removal of entrapped fluid in the tire carcass during the vulcanizing operation.

The foregoing and other objects of the invention are achieved by the methods described hereafter and by the apparatus illustrated in the accompanying drawings wherein:

Fig. 2 is a radial cross-sectional view through a tire-vulcanizing mold illustrating a second form of apparatus for practicing the present invention;

Fig. 3 is a view similar to Figs. 1 and 2 of a third type of apparatus embodying the features of the invention;

Fig. 4 is a similar view to Figs. 1 to 3 and illustrates still another embodiment of the apparatus of the present invention.

Fig. 5 is an axial cross-sectional view showing the principles of the invention as applied to a super-balloon-type of tire which mounts directly upon a small hub.

Figure 1:
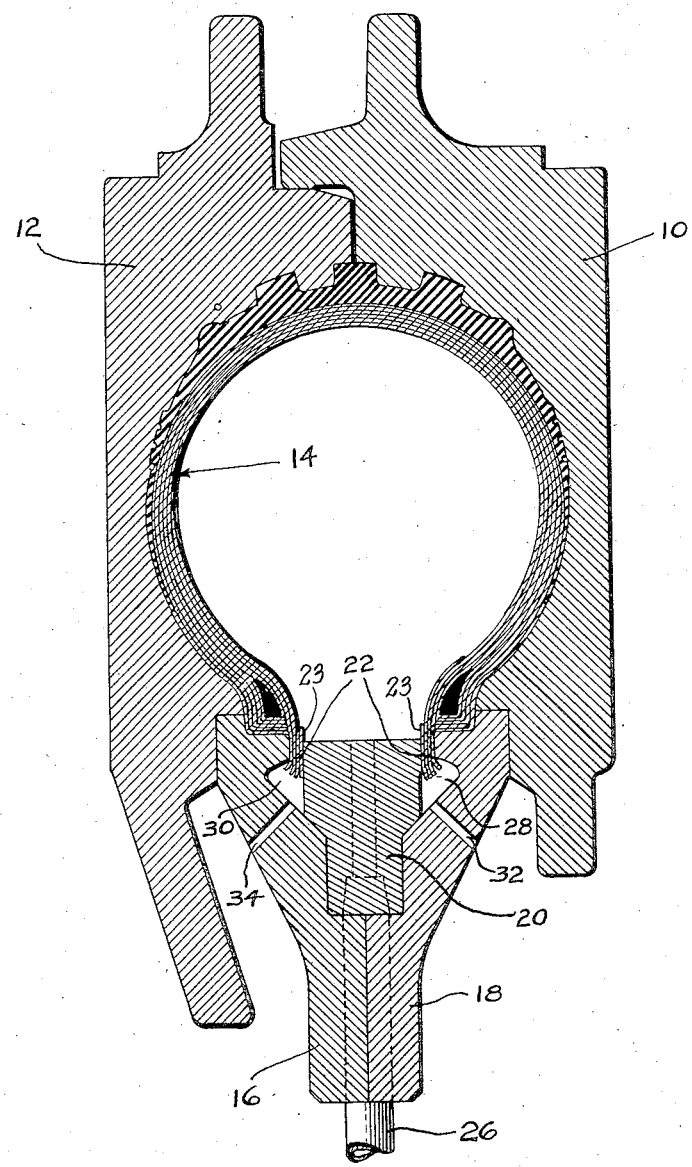
Fig. 1 is a radial cross-sectional view of one form of the apparatus of the present invention.

Referring to the drawings in which several embodiments of apparatus comprising the various features of the invention have been illustrated and more particularly referring to Fig. 1, the numerals 10 and 12 indicate the halves of the usual tire vulcanizing mold which is adapted to receive in its cavity a tire indicated generally at 14. The radially inner sides of the tire molds 10 and 12 are provided with suitable recesses for receiving the bead-supporting mold rings 16 and 18 which are in turn adapted to carry a mid ring 20.

According to the principles of the present invention the beads of the tire 14 are provided with extending pinch-toe portions indicated at 22 which extend radially inwardly of the tire and which in one well-known form comprise fabric material that extends well up into the tire carcass so that any air entrapped or seeping into the tire carcass can flow down thru the relatively pervious cords to the toe portions 22 of the tire 14. Ordinarily the pinch toes of the tire may include one or more plies of the tire and also the chafer strip or strips as desired. The materials are all the usual rubberized fabric altho the invention contemplates putting in a non-rubberized strip of fabric for bleeding purposes. The purpose is to provide material which is pervious to fluid and will conduct it to a lower pressure region. It is also contemplated to use only chafer strips or auxiliary contact strips to establish a contact or path of discharge for the bleeding fluid.

The mid ring 20 and the bead-supporting mold rings 16 and 18 are adapted to pinch the toes 22 of the tire 14 between them as clearly illustrated in Fig. 1. The toes of the tire are thus held securely between the metal rings whereby the bead portions of the tire are completely sealed in the mold assembly so that air or other fluid under pressure which is passed to the interior of the tire thru a conduit such as that indicated at 26 cannot escape from the interior of the tire.

The considerable pressure normally employed for this inflating fluid, normally in the neighborhood of up to about 200 pounds per square inch, will very effectively force any trapped fluid in the tire carcass to flow out thru the pervious cords of the pinch toes 22 of the tire 14. It is also the general practice to coat the interior of the tire prior to the vulcanizing operation with a film of impervious material such as a gelatin solution which prevents any escape of the pressure fluid into the tire carcass.

It is also advisable to employ circumferential strips 23 of relatively thin rubber over the inner side of the fringes or toe portions of the tire which lay between the clamping portions of the mid ring and the tire carcass. In order to more effectively take care of the escape or bleeding of this trapped air the bead-supporting mold ring 16 and 18 may be formed with chambers 28 and 30. These chambers are vented to the exterior of the mold assembly by ducts 32 and 34.

The mold assemblies of the type illustrated in Fig. 1 are ordinarily employed in what is termed a pot heater in the tire industry, which is a long vertical boiler-like apparatus having a hydraulic ram arrangement for taking a plurality of superimposed mold assemblies and for exerting simultaneous pressure on the stacked assemblies. The interior of the tires are connected to a source of fluid pressure, ordinarily air, but sometimes other fluids, and the pot heater itself is filled with vulcanizing steam under considerably lower pressure than the air for inflating the tires during the curing operation. Thus the air which is bled from the tire carcass during the vulcanizing operation can readily escape into the pot heater itself against the comparatively low steam pressure therein.

It will be appreciated that the pressure clamping the pinch toes 22 of the tire during the vulcanizing operation will be sufficient to prevent the escape of the fluid under pressure in the interior of the tire but will not be so great as to cut off the bleeding of fluid thru the pinch toes of the tire as above explained.

After the vulcanizing operation the pinch-toe portions 22 of the tire 14 can be removed, the tire being then ready for use, or if found desirable under certain circumstances strips of chafing fabric or gum may be applied over the pinch-toe portions of the tire after the same are cut from the beads of the tire. In certain installations or uses of the tires the pinch toe need not be removed but can be originally shaped or subsequently skived to form protecting flaps or the like.

In the embodiment of the invention illustrated in Fig. 2 the numerals 40 and 42 indicate the usual mold halves adapted to receive at their radially inner sides the mold rings 44 and 46. In this form of the invention the pneumatic tire indicated generally at 48 is formed with pinch toes 50 similar to those described above in conjunction with Fig. 1, and the pinch toes 50 are adapted to be clamped directly between the mold rings 44 and 46. The mold rings are provided with companion cavities 52 from which extend venting ducts 54 and a conduit 56 is provided for supplying fluid under pressure to the interior of the tire during the vulcanizing operation. The operation of this type of apparatus is similar to that described above in conjunction with Fig. 1.

In the form of the invention illustrated in Fig. 3 the numerals 60 and 62 indicate the usual mold halves which are adapted to receive the cooperating mold rings 64 and 66. The numeral 68 indicates generally a pneumatic tire adapted to be vulcanized and having formed at the bead portions thereof pinch toes or fabric extensions 70 of the type and character described above with relation to Fig. 1. The pinch toes 70 are adapted to be clamped against the mold rings 64 and 66 and this is accomplished as illustrated in the drawings thru the agency of an auxiliary mid ring 72 which is formed with radially inwardly extending rib 74 which engages between the mold ring 64 and 66.

The rib 74, while serving to normally guide and center the mid ring 72 in the mold assembly, is formed of somewhat smaller dimensions than the receiving groove in the mold rings 64—66 so that the mid ring 72 will have comparatively free lateral or floating movement in the mold rings. This permits an equalization of pressure upon the two pinch toes 70 of the tire 68 and thereby effects a more even and positive seal. The mold rings 64 and 66 are provided with vents 76 and 78 which extend to cavities that receive the pinch toes and permit escape or bleeding of the fluid from the tire carcass during the vulcanization operation. The operation of the apparatus as a whole is similar to that described above in conjunction with the apparatus illustrated in Fig. 1.

In the type of equipment shown in Fig. 4 the numerals 80 and 82 indicate the usual mold halves which are adapted to receive bead-supporting mold rings 84 and 86. Positioned in the mold halves is a tire indicated generally by the numeral 88 which is formed with fabric radially inner extensions called "pinch toes" and marked with the numerals 90. The pinch toes 90 are adapted to be sealed in the mold rings 84 and 86 and to this end an expansible mid ring indicated generally by the numeral 92 may be employed.

The expansible mid ring 92 comprises two portions 94 and 96 which are adapted to have relative lateral movement with each other and suitable sliding shoulder portions such as shown at 98 may be formed on the portions 94 and 96 to assist in achieving this purpose. The portions 94 and 96, to assist in handling the same during mold assembly and dissembly operations, may be secured together at circumferentially spaced points by links 100 which allow sufficient but limited relative lateral movement of the portions 94 and 96 during the vulcanizing operation. Positioned at the outer side of the portions 94 and 96 of the mid ring 92 is a cavity adapted to be filled by a wedge-shaped sealing ring or gasket 102. This gasket is ordinarily made of rubber or like material and functions to urge the portions 94 and 96 laterally apart under the action of the fluid pressure supplied to the interior of the tire, during vulcanization, by conduit means which are not shown on the drawings for the sake of clearness. The invention contemplates providing a plurality of conduit leads to the interior of the tire whereby it is possible to circulate fluid thru the interior of the tire to assist in the curing operation.

The pinch-toe portions 90 of the tire carcass 88 are adapted to be connected by suitable chambers 104 and by vents 106 with the radially inner side of the mold assembly and in this manner the escape of any fluid trapped in the tire carcass will be insured during the vulcanization operation.

The operation of this type of vulcanizing equipment is quite similar to that described above in connection with the description of Fig. 1 and referred to in the description of Figs. 2 and 3. However it will be evident that in this particular mold assembly the sealing action of the mid ring against the pinch-toe portions of the tire carcass will be dependent entirely upon the internal fluid pressure in the tire carcass during vulcanization. This is because the fluid pressure in the tire will act upon the sealing gasket 102 of the mid ring 92 to force the portions 94 and 96 of the mid ring apart and into sealing relation with the pinch toes 90 of the tire carcass.

As will be evident this expansive action results from the rubber acting to create an effective seal between the split sections of the mid ring whereby the fluid pressure in the interior of the tire will be applied to all portions of the channel containing the gasket either directly or thru the rubber gasket itself whereby the ring is laterally expanded.

The construction of the apparatus shown in Fig. 4 also insures that when the mold assemblies are used in stacked relation in a pot heater under heavy ram pressures that the force of the ram holding the mold closed will be borne directly by the mold halves 80 and 86 without having this pressure act to clamp on the pinch toes of the tire carcass. The sealing action on the pinch toes is entirely dependent upon the action described immediately above.

Referring to Fig. 5 of the drawings, the embodiment of the invention has been illustrated which relates to curing super-balloon tires which mount directly upon a hub or axle. In this figure of the drawings the numerals 110 and 112 indicate a watch case or individual type of vulcanizing mold which is adapted to cooperate with bead rings 114 and 116 vented as at 117. The bead rings 114 and 116 are mounted upon a central arbor 118 and this may be accomplished by providing a forced fit between the bead ring 114 and the arbor 118 and by employing a keyed and shouldered connection between the bead ring 116 and the arbor 118. The arbor 118 may be threaded at its one end and receive a nut 120 for securing the bead ring 116 in position. The mold 110—112 is adapted to vulcanize a tire, indicated generally at 124, which tire is provided with pinch-toe portions 126 which extend radially inwardly over the opposed inward ends of the bead-supporting rings 113 and 116. The pinch toes 126 of the tire 124 are different from those illustrated and described above in that they are not made integral with the tire but are comparatively narrow thin strips which are applied to inner portion of the beads as illustrated in the drawings completely after the tire has been built. The strips may be made impervious to function as seating means only with the vents 117 serving to bleed the tire.

Expandible means are provided for clamping the pinch-toe portions 126 of the tire 124 against the ends of the bead rings 114 and 116 and these clamping means may take the form of a member 130 which together with a cooperating member 132 forms an expandable mid ring. The adjacent portions of the members 130 and 132 are formed with a tapering groove which receives a rubber gasket 134. The interior of the tire is subjected to fluid pressure during the curing operation and this may be accomplished by providing a conduit 136 which extends thru a suitable recess in the arbor 118 and which is tapped into a duct 138 in the expansible member 130 of the mid ring. As will be seen from the drawings the pinch-toe portions 126 of the tire carcass 124 are connected to the atmosphere or outside of the mold assembly by providing chambers 140 which extend to the recess for receiving the inflation conduit 136.

The operation of the apparatus just described is quite similar in most respects to that described above with respect to Figs. 1 and 4, in that the inside of the tire carcass 124 is coated with a substantially impervious film, which in the present instance is rubber rather than gelatine as set forth above, and the pinch toes of the carcass are clamped between the mold rings and mid rings. Thus, upon the application of inflation fluid, which may be in the form of non-oxidizing gas such as nitrogen, to the interior of the tire carcass during the curing the pinch toes of the tire will be sealed tightly in position to prevent the escape of any of the inflation fluid, with the fluid bleeding from the tire carcass thru the vents 117. The invention likewise contemplates employing pervious pinch toe strips 126 in the tire with bleeding action thru the toes of the tire as heretofore described.

The arrangement and the size and shape of the pinch toes in all forms of the invention and the size and operating efficiency of the gasket sealing means of the expandible mid rings is all very carefully determined, so that the desired and necessary clamping action on the pinch toes of the tire will be effected without stopping the desired escape or bleeding of air from the tire carcass.

Altho not illustrated in the drawings the invention quite definitely contemplates utilizing the features of the present invention in combination with airbags and bull rings during vulcanization. For example the ordinary green tire can be provided with bleeding fringes or toes such as heretofore described and the tire can be vulcanized with an airbag or bull ring used either alone or in combination with a mid ring. The construction of mold equipment of this character is substantially the same as that heretofore described but in addition the various parts are adapted to make room for and cooperate with the additional members incorporated therewith.

It will also be appreciated that the principles of the invention are readily applicable to the production of pneumatic tires in various types of molds without departing from the teachings contained herein, for example it is possible to employ the forms of the invention shown in Figs. 1 to 4 in watch-case- or individual-type vulcanizing molds. Likewise the form of the invention shown in Fig. 5 can be used in conjunction with mold equipment adapted to be employed with a pot-type heater for vulcanizing purposes.

While the invention has been described specifically in conjunction with the manufacture of pneumatic tires it will be understood that the principles thereof are broadly applicable to the manufacture of substantially any type of moldable material in which ply construction is employed with the resulting possibilities of entrapped fluid. The invention, for example, can be used in the manufacture of any articles in which a rubberized fabric is utilized or in which other and sundry moldable plastics are employed in conjunctions with means which are pervious to air or other fluids or liquids.

By the present invention an improved, efficient vulcanizing method and apparatus have been provided, in that the use of comparatively expensive air-bags is entirely eliminated. Likewise the time for effecting a vulcanizing operation is materially reduced in that the bulk of the material to be raised to vulcanizing temperatures is definitely decreased, as well as permitting the direct contact of the pressure and possibly the heating fluid or other means with the tire carcass. Applicant's new apparatus and process provides a definite and controllable sealing for the bead portions of the tire carcass during a curing operation without the use of interior air bags and functions to permit a controlled bleeding operation of any trapped fluid in the tire carcass during the cure.

In accordance with patent statutes several forms of the invention have been illustrated and described in detail, however it will be recognized that the invention is not limited thereto nor thereby but is defined by the appended claims.

What I claim is:

1. That method of manufacturing pneumatic tires or the like which comprises building the tire carcass with integral toe portions of rubberized fabric adjacent the inner edge of the beads of the tire, which toe portions extend substantially radially inwardly of the beads, covering the inner surface of the toe portions of the tire with impervious rubber, coating the interior of the tire with a film impervious to fluid, surrounding the tire with external molding means, passing fluid under pressure to the interior of the tire while maintaining the toe portions clamped sufficiently tight against the external molding means to prevent escape of the fluid from the interior of the tire, and bleeding any air or other fluid in the tire carcass itself from the carcass thru the toes of the tire to the outside of the external molding means.

2. That method of manufacturing pneumatic tires or the like which comprises building the tire carcass with integral toe portions of rubberized fabric adjacent the inner edge of the beads of the tire, which toe portions extend substantially radially inwardly of the beads, surrounding the tire with external molding means, passing fluid under pressure to the interior of the tire while maintaining the toe portions clamped sufficiently tight against the external molding means to prevent escape of the fluid from the interior of the tire, and bleeding any air or other fluid in the tire carcass itself from the carcass thru the toes of the tire to the outside of the external molding means.

3. That method of making pneumatic tires which comprises building a tire carcass, vulcanizing the same while maintaining a fluid under pressure in the interior cavity of the tire and bleeding the fluids trapped or seeped in the laminations of the tire carcass from the carcass during the vulcanizing operation by providing fabric portions of the tire carcass which are open to a reduced pressure region during the vulcanizing operation.

4. In the process of producing tires of laminated rubberized fabric, the steps of forming the tire with associated laminations of rubberized fabric which extend beyond the normal contour of the tire, surrounding the tire with molding means which leave the outer portions of the associated laminations unconfined, bleeding fluids from the tire thru the extending laminations during the vulcanizing operation, thereafter trimming off the extending laminations to leave the finished tire of proper dimensions but with a carcass of laminated construction from which substantially all fluid has been bled.

5. In the process of producing tires of laminated rubberized fabric, the steps of forming the tire with associated laminations of rubberized fabric which extend beyond the normal contour of the tire, surrounding the tire with molding means which leave the outer portions of the associated laminations unconfined, bleeding fluids from the tire thru the extending laminations during the vulcanizing operation.

6. In the process of producing articles of laminated fabric impregnated with a moldable plastic, the steps of forming the article with extensions of certain of the fabric laminations beyond the normal outlines of the article, vulcanizing the article under pressure with the extensions of the laminations so confined as to insure escape of fluid trapped in the interior of the article thru the extensions.

7. The steps in the manufacture of pneumatic tires without the use of airbags which comprise providing the green tire carcass with associated portions extending substantially radially inwardly of the tire beads, surrounding the tire with external molding means, clamping the extending portions of the tire against the external molding means with a controlled pressure, passing fluid under pressure to the interior of the tire and subjecting the assembly to vulcanizing heat while maintaining the controlled clamping pressure such as to insure bleeding of trapped fluids from the tire carcass.

8. The steps in the manufacture of pneumatic tires without the use of airbags which comprise providing the green tire carcass with associated portions extending substantially radially inwardly of the tire beads, surrounding the tire with external molding means, clamping the extending portions of the tire against the external molding means with a pressure controlled by the fluid pressure within the tire, passing fluid under pressure to the interior of the tire and subjecting the assembly to vulcanizing heat.

9. The method of making pneumatic tires which comprises extending certain fabric portions of the tire beyond the normal configuration of the tire and vulcanizing the tire under heat and pressure while maintaining the extending portions of the tire free to discharge entrapped air from the tire carcass.

10. Apparatus for the production of tires without the use of airbags comprising cooperating mold halves for surrounding and shaping the exterior of the tread and sidewall portions of the tire, a multi-part mold ring received in the mold halves and adapted to surround and shape the exterior of the beads of the tire, a multi-part expandible mid ring positioned in a suitable channel in the mold rings, means in the mid ring controlled by fluid pressure within the tire for expanding the multi-parts thereof laterally and for clamping extending portions of the tire beads against the mold rings whereby the tire can be vulcanized without an airbag.

11. Apparatus for the production of tires without the use of airbags comprising cooperating mold halves for surrounding and shaping the exterior of the tread and sidewall portions of the tire, a multi-part mold ring received in the mold halves and adapted to surround and shape the exterior of the beads of the tire, a multi-part expandible mid ring positioned in a suitable channel in the mold rings for clamping extending portions of the tire beads, whereby the tire can be vulcanized without an airbag.

12. Molding equipment for vulcanizing pneumatic tires having pinch-toe type beads, which equipment comprises molding means for surrounding and shaping the exterior of the tire and an expandible clamping ring for holding the pinch-toe portions of the bead against the molding means, said clamping ring including parts relatively laterally movable, said parts supporting a gasket controlling their position and subject to the fluid pressure inside the tire.

13. Molding equipment for vulcanizing pneumatic tires having pinch-toe type beads, which equipment comprises molding means for surrounding and shaping the exterior of the tire and receiving the pinch toes of the tire beads and an expandible clamping ring for holding the pinch-toe portions of the bead against the molding means.

14. Molding equipment for vulcanizing pneumatic tires having pinch-toe type beads, which equipment comprises molding means for surrounding and shaping the exterior of the tire and an expandible clamping ring for holding the pinch-toe portions of the bead against the molding means, said clamping ring and molding means being chambered adjacent the end of the pinch toes of the beads whereby the tire may bleed to the exterior of the molding equipment during the vulcanizing operation.

15. Molding equipment for vulcanizing pneumatic tires having pinch-toe type beads, which equipment comprises molding means for surrounding and shaping the exterior of the tire and receiving the pinch toe beads and a clamping ring for holding the pinch-toe portions of the bead against the molding means whereby fluid under molding pressure can be passed to the interior of the tire without the use of an airbag and vents in the molding means for bleeding the tire during the cure.

16. Apparatus for vulcanizing pinch-toe type tires, which apparatus includes a multi-part main mold having complementary molding cavities adapted to receive the tire and the pinch toes and a mid ring having floating movement in the main mold and serving to clamp the pinch toes of the tire down against the main mold which is suitably vented to permit the bleeding of fluid escaping from the pinch toes of the tire.

17. Apparatus for curing pinch-toe pneumatic tires comprising an arbor, a pair of bead rings on the arbor, main mold members adapted to be secured around the bead rings and arbor, a member on the arbor between the bead rings for clamping the pinch toes of the tire against the bead rings and means on the member controlled by the fluid pressure in the tire for expanding the member and controlling the clamping pressure.

RALPH B. DAY.